United States Patent Office 3,397,657
Patented Aug. 20, 1968

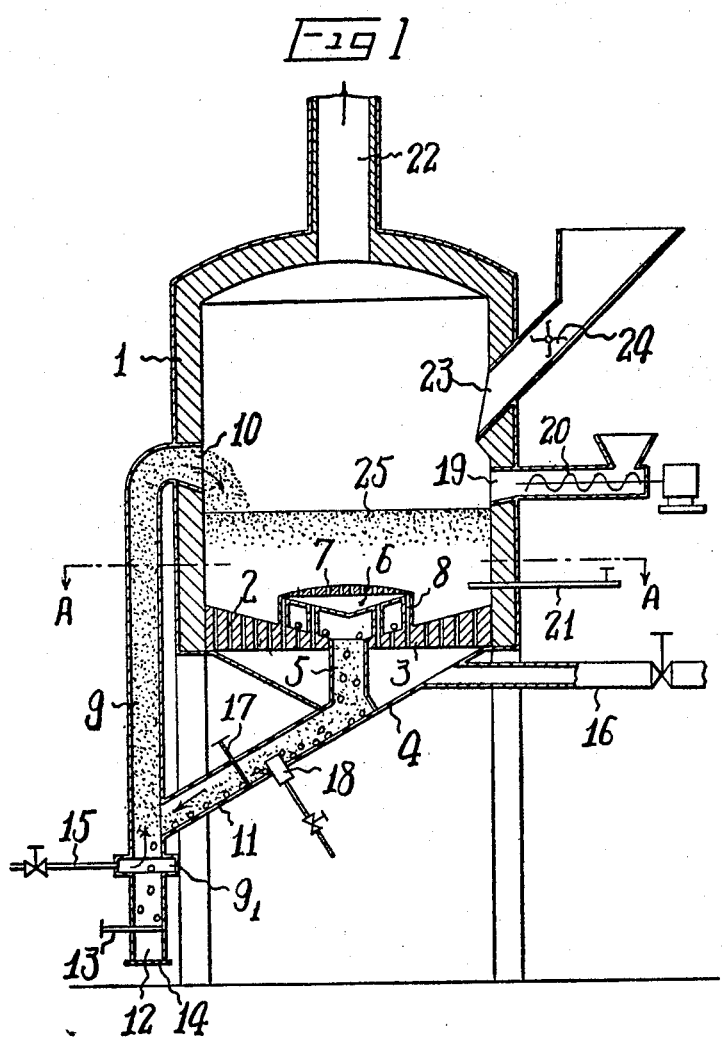

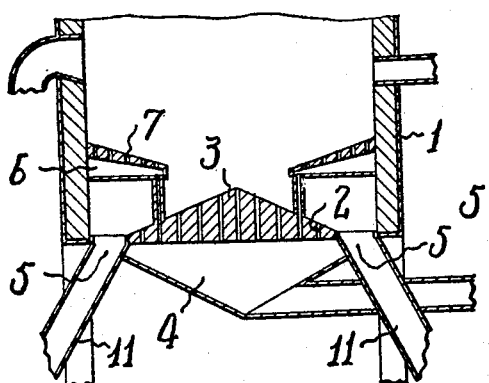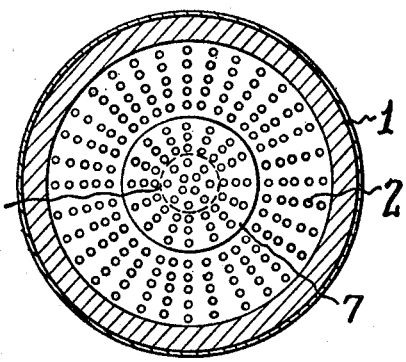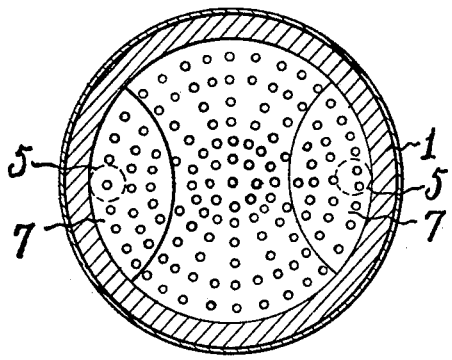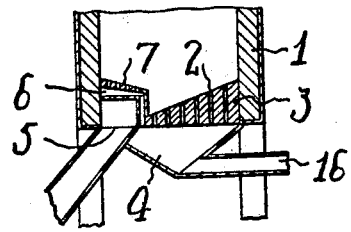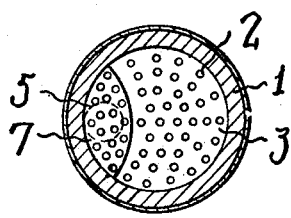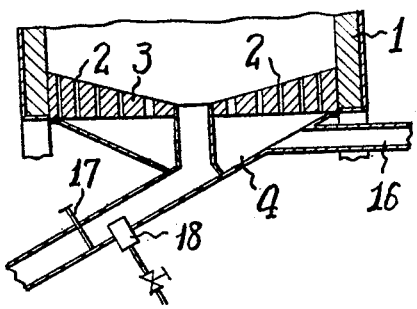

3,397,657
APPARATUS FOR CONTINUOUSLY
BURNING WASTES
Mitsuru Tada, 2-17-3 Minamicho, Fuchu, Tokyo, Japan
Filed Oct. 25, 1966, Ser. No. 589,384
Claims priority, application Japan, Nov. 1, 1965,
40/67,092
10 Claims. (Cl. 110—8)

ABSTRACT OF THE DISCLOSURE

An apparatus for continuously burning the inflammable constituents of a waste material mixture in a bed of a fluidized medium while separating the non-inflammable constituents, is formed of an upright housing containing a transversely arranged flow plate. An outlet is located through the flow plate at the lowermost point of its inclined upper surface. The flow plate has a plurality of nozzles extending through it and communicating with a wind box below the plate. A discharge pipe extends from the outlet in the plate to an aeration pipe located outside the housing. During operation the fluidized medium containing the inflammable and non-inflammable materials flows downwardly on the flow plate, the inflammable materials are burned and the non-inflammable material with the fluidized medium pass through the outlet into the discharge pipe. From the discharge pipe the materials enter the aeration pipe wherein pressurized air separates the non-inflammable material from the fluidized medium. The non-inflammable material is removed from the aeration pipe and the fluidized medium flows upwardly through the aeration pipe and returns into the housing. A burner extends into the housing above the flow plate for igniting the inflammable constituents in the bed of fluidized medium.

---

This invention relates to an apparatus for burning inflammable wastes containing non-inflammable materials in a continuously effective manner.

Food garbage (wastes of vegetable and animal foods), miscellaneous wastes (paper, fiber, wood, bamboo, plastics, rubber, leather, weeds, fallen leaves, etc.) smeared mud arising from the treatment of dirty water, barks, human or animal faces are all known to contain large amounts of water and moreover, in most cases, such non-inflammable parts as mud, sand, glass or metal wastes. The percentage content of non-inflammable materials is very large especially in food wastes and miscellaneous ones.

The basic object of the present invention is to provide a burning furnace which is capable of burning inflammable wastes, of essentially high water content and which also contain non-inflammable materials in an effective and continuous manner without separating such non-inflammable materials beforehand and causing such non-inflammable materials to be discharged from the furnace in a continuous manner. Another object of the present invention is to offer an apparatus for continuously burning wastes characterized by the fact that there are provided a flow plate means having an upper surface inclined at a suitable angle beneath the lower part of the furnace, a wind box at the lower surface of said flow plate means for connection to the orifice nozzles thereof, an outlet for the discharge of non-inflammable materials at the inclined lower end of said flow plate means on one hand, an air pipe extends upwardly from below said outlet on the other hand, the upper end of said air pipe open into the furnace above said outlet which is connected to said air pipe intermediate its height and another outlet for non-inflammable materials being also disposed at the bottom part of said air pipe.

Still another object of the present invention will be self-explanatory from the following description in detail, with reference to the accompanying drawings wherein:

FIG. 1 is a vertical section of a burning apparatus according to the present invention;

FIG. 2 is a sectional plan view of the burning apparatus taken along the line A—A of FIG. 1;

FIG. 3 is a partial sectional view of a modified arrangement of the flow plate means shown by FIG. 1;

FIG. 4 is a sectional plan view of the arrangement shown in FIG. 3;

FIG. 5 is a partial vertical sectional view of another modified arrangement of the flow plate means;

FIG. 6 is a sectional plan view of the arrangement shown in FIG. 5; and

FIG. 7 is a partial vertical sectional view of another modified arrangement of the flow plate means.

In FIG. 1, reference 1 is a furnace body, and a first flow plate 3 with many orifice nozzles 2 is disposed in the lower part of the furnace 1. Beneath the lower surface of the flow plate 3 is a first wind box 4 in communication with said nozzles 2. Reference 5 is an outlet for non-inflammable materials, disposed at the lower portion of the inclined upper surface of said flow plate 3. Above said outlet 5 is provided a second wind box 6 a distance apart from and covering said outlet, and a second flow plate 7 forms the upper surface of said wind box 6. Reference 8 is an air pipe which serves not only to support the second wind box 6 on the flow plate 8 but also to connect the second wind box 6 to the first wind box 4. Reference 9 is another air pipe which extends upwardly from below the outlet 5 and the upper end 10 of the air pipe 9 opens into the upper part of the furnace 1. Reference 11 is a discharge pipe, its upper end is connected to the outlet 5 and its lower end is connected to the air pipe 9 intermediate its height. Reference 12 is an exhaust pipe for non-inflammable materials, disposed at the bottom part of air pipe 9 and in this embodiment it is provided with a damper 13 near its lower end which is further equipped with an open-and-close member 14. Both members 13 and 14 may be of usual construction for practical use. Reference 15 is a feed pipe of pressurized air for said air pipe 9 as connected to a supply source of pressurized air (not shown in the drawing) on one hand and is further connected to an expanded portion $9_1$ of the air pipe 9 on the other hand. The above mentioned air pipe 9, its upper end opening 10, the outlet pipe 12 for non-inflammable materials, and the pressurized air feed pipe 15 are designed to constitute an aeration means in the above mentioned manner. Reference 16 is a feed pipe of pressurized air for the first wind box 4 and is connected to either the same supply source as said feed pipe 15 or another feed pipe. Reference 17 is a damper inserted in the discharge pipe 11. Reference 18 is an aeration device of usual construction and is disposed at a suitable position in said discharge pipe 11. Moreover, there are provided a feed inlet 19 for a fluidized medium, a screw feeder 20 disposed at said inlet, a burner 21, a funnel 22, a dust inlet 23, a rotary feeder 24, and a layer 25 of fluidized medium formed on the first flow plate 3. Usually sand is used as a fluidized medium but chamotte particles or residual particles of roasted ores may also be used, insofar as they are non-inflammable granular solids which cannot become soft at any burning temperature. At the same time, they may preferably be of a larger specific gravity than inflammable materials and of a smaller specific gravity than non-inflammable ones, and between the limits of mesh, 0.05–1.5 mm. The inclined angle of said first flow plate 3 is preferably between 10°–15°.

In the case of a furnace of a relatively small diameter for use, it in possible to use a one-side inclined flow plate as shown in FIG. 3. In this case, the second flow plate 7 will be arranged in position as shown in FIG. 4. In the case of a furnace of a relatively large diameter, the first flow plate 3 will be arranged better in the form of a chevron, in section, as shown in FIG. 5. By this means, an advantage is ensured such that the discharge pipe 11 can be shorter, as compared with such system where the outlet 5 is centrally disposed. Moreover, instead of establishing the second wind box 6 and the second flow plate 7, either the nozzles 2 are made larger in size toward the lower portion of the upper inclined surface as shown in FIG. 7 or they are increased in number thereby enabling the whole fluidized bed to flow in a uniformly fluidized form.

The present apparatus is understood to work in the following manner.

First of all, a suitable amount of fluidized medium with the addition of fuel, e.g. pulverized coal is fed from the inlet 19, the heavy oil burner 21 is ignited and air is supplied to the wind boxes 4 and 6 from the air supply source (not shown in the drawing) through the feed pipe 16. The air thus fed is ejected from the orifice nozzles of both flow plates 3 and 7 to reach said pulverized coal, thereby fluidizing said fluidized medium on the flow plate. Thus the pulverized coal is ignited by means of the heavy oil burner 21 and is burnt satisfactorily. When the temperature of fluidized medium has risen until its fluidization progresses sufficiently, wastes are thrown into the furnace from the inlet 23, ignited and burnt while fluidizing the wastes through intermediation of the fluidized medium. When the temperature of the furnace reaches around 750° C., the heavy oil burner is put out. When using sand of 0.2–0.8 mm. mesh as the fluidized medium, it is necessary to feed air into the furnace at the rate of 40–60 cm./sec. to produce a perfect fluidization of fluidized medium and to maintain the temperature of the furnace at 950° C. or thereabouts. In case the water content in the wastes shows less than 40%, the temperature of the furnace tends to rise higher than necessary. Then a cooling medium, e.g. water, is poured into the fluidized bed to maintain the furnace at an appropriate temperature.

While the burning procedure is kept going on, food wastes and miscellaneous portions of the whole dust are caused to float in the fluidized medium and are burnt well because they are of a smaller specific gravity than the fluidized medium. On the other hand, non-inflammable materials such as mire, sand, glass or metals, stone, glass, ceramics, empty metal cans, etc. are destined to sink down beneath the fluidized medium because they are of a larger specific gravity and mesh than the fluidized medium, further they move down along the slant surface of the flow plates 3 and 7 and together with some part of the fluidized medium, flow down into the air pipe 9 from the discharge outlet 5. The fluidized medium and said non-inflammable materials in said air pipe 9 are sifted with blowing air at a flow rate greater than the terminal speed of said fluidized medium flowing upwardly from the lower end of the air pipe 9 so that the fluidized medium may rise up in the air pipe 9 and be refluxed into the furnace from its opening 10 on one hand, and on the other hand the non-inflammable materials thus separated can move down in the air pipe 9 for discharge finally from the exhaust pipe 12.

The above-mentioned sifting procedure with blowing air is carried out by adjusting the opening degree of the damper 17 and the amount of air from the feed pipe 15. In this case, the aeration device 18 prevents the non-inflammable materials from staying in the exhaust pipe 11. In carrying out the above-mentioned procedure, there occurs a difference in pressure between the outlet 5 for non-inflammable materials and the opening 10 with the result that said air circulation can be kept going on to a satisfactory degree. The discharge of the non-inflammable materials from the exhaust pipe 11 may preferably be carried out as follows. Namely, it is necessary to open the damper 13, to begin with, so that the non-inflammable materials are caused to drop onto the open-and-close member 14, and when they are collected in suitable heaps, the damper 13 is closed after which said open-and-close member 14 is opened to allow the non-inflammable materials to be discharged outwardly of the pipe. Subsequently, said open-and-close member 14 is closed and the damper 13 is opened after which the same is closed so that the non-inflammable materials can be discharged outwardly of the pipe by opening the open-an-close member 14 again. Thus this operation is repeated in the same manner. It is also permitted to use a rotary air-tight exhaust device instead of said damper 13 and open-and-close member 14.

The ashes arising from the burning operation are carried away by means of feed-in air and burning air and discharged outwardly of the furnace body from the funnel 22 for collection by means of a separator and collector, e.g. of the cyclone-type collector (not shown in the drawing). In case the wastes for treatment are dust and dirt, the miscellaneous wastes and food wastes thereof may contain about 20% of non-inflammable materials in most cases and to make the matter worse, about 50% of such non-inflammable materials are ones of extremely large size. Since the present invention is so embodied as explained hereinbefore, it is made very easy to discharge such non-inflammable materials in an extremely effective manner. Consequently, according to the present invention, it is possible to burn the wastes very effectively as they are, without separating large-size mire and sand, glass, ceramics, metals from the wastes containing such materials beforehand. Furthermore, it is possible to burn inflammable materials such as smeared mud, feces, barks, etc. also very effectively and at the same time, to discharge non-inflammable materials contained therein in a continuous manner.

Apparently, the present invention includes other various embodiments in the scope of the appended claims.

What I claim is:

1. Apparatus for continuously burning waste material in a bed of fluidized medium, wherein both inflammable and non-inflammable waste material are charged into the apparatus, comprising an upright housing forming a furnace, a flow plate for supporting the bed of fluidized medium extending transversely of said housing and having an upper inclined surface and a lower surface, a plurality of nozzles extending through said plate between the lower and the upper surface thereof, an outlet through said flow plate located at the lowermost portion of the upper inclined surface thereof, a discharge pipe connected at its upper end to said outlet and extending downwardly therefrom and through said housing, an aeration pipe located exteriorly of said housing and having its upper end opening into said furnace above said flow plate and having its lower end positioned below said flow plate, said discharge pipe opening into said aeration pipe intermediate the ends of said aeration pipe, discharge means in the lower end of said aeration pipe, pressurized air inlet means in said aeration pipe located between said discharge opening from the aeration pipe and the connection of said discharge pipe to said aeration pipe wherein non-inflammable waste material accumulates on said flow plate and passes downwardly to said outlet with the fluidized medium and through said discharge pipe into said aeration pipe wherein pressurized air separates the fluidized medium and the non-inflammable material with the fluidized material passing upwardly and returning into the furnace through the upper end of the said aeration pipe and the non-inflammable material passing downwardly for removal from said aeration pipe through the discharge opening therein.

2. An apparatus as set forth in claim 1, wherein a second flow plate is spaced above said flow plate superimposed above said outlet in said flow plate, and means for supporting said second flow plate from said flow plate.

3. An apparatus as set forth in claim 2, wherein wall means in combination with said second flow plate form a wind box disposed above the outlet in said flow plate, and air conduits extend upwardly from said nozzles through said flow plate to said wind box for delivering air therethrough and for supporting said wall means and said second flow plate.

4. An apparatus as set forth in claim 1, wherein a damper is positioned in said discharge pipe for regulating the passage therethrough of the fluidized medium and non-inflammable materials from said furnace into said aeration pipe.

5. An apparatus as set forth in claim 4, wherein an aeration device is connected to said discharge pipe for assuring the movement of non-inflammable material therethrough downwardly into said aeration pipe.

6. An apparatus as set forth in claim 1, wherein a damper is positioned in said aeration pipe between said discharge opening and said pressurized air inlet means for selectively opening and closing the passage leading to said discharge opening for selectively discharging the non-inflammable material from said aeration pipe.

7. An apparatus as set forth in claim 1, wherein said outlet through said flow plate is centrally located therein.

8. An apparatus as set forth in claim 1, wherein said upper surface of said flow plate is inclined from one side of said housing to the opposite side thereof with said outlet through said plate located at the intersection of the lowest portion of the upper surface and said housing.

9. An apparatus as set forth in claim 1, wherein the highest point of said upper surface of said flow plate is centrally positioned within said housing, and said upper surface slopes downwardly therefrom to the inner surface of said housing, a plurality of said outlets located at the intersection of the lowest portion of the inclined upper surface of said flow plate and the inner surface of said housing.

10. An apparatus as set forth in claim 1, wherein a burner is positioned within said furnace above said flow plate, a feed inlet is positioned through said housing above said burner, and a waste inlet extends through and into said housing above said fuel inlet for delivering wastes into said furnace.

References Cited

UNITED STATES PATENTS

| | | | |
|---|---|---|---|
| 1,204,530 | 11/1916 | Wright | 110—12 |
| 1,638,771 | 8/1927 | Jones | 110—12 |
| 2,246,224 | 6/1941 | Streander | 110—8 X |
| 2,903,981 | 9/1959 | Brink | 110—165 |
| 3,306,236 | 2/1967 | Campbell | 110—8 |

FOREIGN PATENTS

| | | |
|---|---|---|
| 858,462 | 1/1961 | Great Britain. |

JAMES W. WESTHAVER, *Primary Examiner.*